(12) United States Patent
Buckland et al.

(10) Patent No.: US 6,865,615 B1
(45) Date of Patent: Mar. 8, 2005

(54) METHOD AND AN APPARATUS FOR DYNAMICALLY RECONFIGURING A SYSTEM BUS TOPOLOGY

(75) Inventors: Pat Allen Buckland, Austin, TX (US); Scott Leonard Daniels, Cedar Park, TX (US); Thomas R. Forrer, Jr., Round Rock, TX (US); Daniel Eugene Pridgeon, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 837 days.

(21) Appl. No.: 09/620,721

(22) Filed: Jul. 20, 2000

(51) Int. Cl.$^7$ .............................................. G06F 15/16
(52) U.S. Cl. .............................. 709/249; 710/8; 714/48
(58) Field of Search .............................. 709/220, 213, 709/217, 231, 249; 710/8, 126, 7, 14; 711/162, 114; 714/4, 6, 22, 43, 48; 340/5.74, 5.23, 825; 370/489

(56) References Cited

U.S. PATENT DOCUMENTS

| | | | | |
|---|---|---|---|---|
| 5,539,803 A | * | 7/1996 | Bhat et al. ..................... | 379/21 |
| 5,765,031 A | * | 6/1998 | Mimuth et al. ................ | 714/43 |
| 5,784,577 A | * | 7/1998 | Jacobson et al. ............ | 710/104 |
| 5,867,645 A | * | 2/1999 | Olarig ........................... | 714/48 |
| 5,884,190 A | * | 3/1999 | Lintula et al. ............... | 455/557 |
| 6,378,084 B1 | * | 4/2002 | Strunk et al. .................. | 712/2 |
| 6,516,370 B1 | * | 2/2003 | Mulvihill et al. ........... | 710/305 |
| 6,557,049 B1 | * | 4/2003 | Maloy et al. .................. | 710/8 |

OTHER PUBLICATIONS

Simmons et al; Releasing the POwer of I/O Bound Systems; www.vcubed.com.*

Implementation of Distributed Systems described with LOTOS..—Keiichi Yasumoto; www-tani.ics.es.osaka-u.ac.jp/people/yasumoto.ref/psfiles/forte97.ps.gz.*

On–Line Extraction of SCSI Disk Drive Parameters—Worthington, Ganger, Patt.. (1995); www.ece.cmu.edu/~ganger/papers/sigmetrics95.ps.*

* cited by examiner

Primary Examiner—Thong Vu
(74) Attorney, Agent, or Firm—Duke W. Yee; Mark E. McBurney; Frances Lammes (57) ABSTRACT

A method and an apparatus is presented for configuring a system bus topology dynamically. In a preferred embodiment, the system bus is a Small Computer System Interface (SCSI) bus that connects a "daisy" chain of disk drives. Two types of disk drives are used: single ended (SE) "Ultra" drives capable of 20 MHz operation and LVD (low voltage differential) "Ultra Plus" drives capable of 40 MHz operation. LVD disk drives can also function in the slower SE mode. The first drive in the chain of drives may need to be connected by a cable over three feet long. This introduces signal degradation that is often overcome by introducing redrive circuitry to boost signal quality. This is an expensive solution and a much easier solution is presented: install a jumper between the last drive in the chain and the first drive. However, if LVD bus mode is used, then this jumper solution does not work and the jumper must be removed. Disk drives in a server system are "hot swappable," which means they can be changed at run time without shutting down the system. A method and an apparatus is provided for dynamically testing for the appropriate mode of bus operation based on the currently installed disk drives and adjusting the jumper setting accordingly.

33 Claims, 5 Drawing Sheets

METHOD AND AN APPARATUS FOR DYNAMICALLY RECONFIGURING A SYSTEM BUS TOPOLOGY

BACKGROUND OF THE INVENTION

1. Technical Field

The present invention relates generally to an improved system bus topology and, in particular, to a method and an apparatus for configuring a bus topology. Still more particularly, the present invention provides a method and an apparatus for detecting the type of hard drives connected to the bus and automatically configuring the bus for improved performance.

2. Description of the Related Art

In a client-server network many clients are constantly making requests that require fast responses from the server or servers. Requests typically require access to information stored in a large data repository that is spread over many hard disk drives. The performance of the hard disk drive subsystem is critical to overall client-server system performance.

The SCSI (Small Computer System Interface) expansion bus is a commonly used bus to connect a chain of disk drives to a computer system. A disk drive that connects to a chain of disk drives may have different capabilities that other disk drives in the chain. For example, for SCSI hard disks, some may use a 20 MHz mode of operation called "Ultra" while others are capable of a 40 MHz mode of operation called "Ultra Plus". It would only take one disk drive capable of only "Ultra" performance to slow an entire chain of disk drives down from a 40 MHz bus speed to a 20 MHz bus speed.

The use of the SCSI bus and the bus protocols "Ultra" and "Ultra Plus" are for illustrative purposes only. The type of bus and the types of protocols on a particular bus may vary, but the central problem remains to automatically configure the bus system for improved performance.

In a large server facility where there are many machines each supporting multiple chains of disk drives, there is the need to accommodate changes in configurations quickly and automatically. For example, it is common to "hot swap" one disk drive for another disk drive, but it would be prohibitively wasteful for a system administrator to inspect all the other drives in the chain to verify they all use the same protocol.

Therefore, it would be advantageous to have an apparatus and a method that allows a system bus to automatically detect the type of hard disk drives connected to a system bus and to automatically reconfigure the system bus based on the type of hard disk drives to provide for improved performance.

A server machine should also support multiple disk drives on the same chain and, due to physical constraints of supporting many different chains, allow for a "long" cable to reach the first disk drive. A typical chain will contain six disk drives and the cable length may need to be longer than 3 feet. The long cable length results in signal degradation so that it is difficult to operate several disk drives without introducing bus errors. One common approach is a add "redrive" circuitry at the end of the cable to boost the signal strength, but this is relatively expensive solution.

Therefore, it would be advantageous to find a way to maintain signal quality in the presence of many disk drives on the same chain without needing to install redrive circuitry.

SUMMARY OF THE INVENTION

A method and an apparatus is presented for configuring a system bus topology dynamically. In a preferred embodiment, the system bus is a Small Computer System Interface (SCSI) bus that connects a "daisy" chain of disk drives. Two types of disk drives are used: single ended (SE) "Ultra" drives capable of 20 MHz operation and LVD (low voltage differential) "Ultra Plus" drives capable of 40 MHz operation. LVD disk drives can also function in the slower SE mode.

The first drive in the chain of drives may need to be connected by a cable over three feet long. This introduces signal degradation that is often overcome by introducing redrive circuitry to boost signal quality. This is an expensive solution and this invention introduces a much easier solution: install a jumper between the last drive in the chain and the first drive. However, if LVD bus mode is used, then this jumper solution does not work and the jumper must be removed.

Disk drives in a server system are "hot swappable," which means they can be changed at run time without shutting down the system. This invention provides a method and an apparatus for dynamically testing for the appropriate mode of bus operation based on the currently installed disk drives and adjusting the bus topology accordingly. Although the preferred embodiment deals with a SCSI system bus and SE or LVD disk drives, the invention, in general, can be applied to any system bus that requires dynamic configuration at run time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
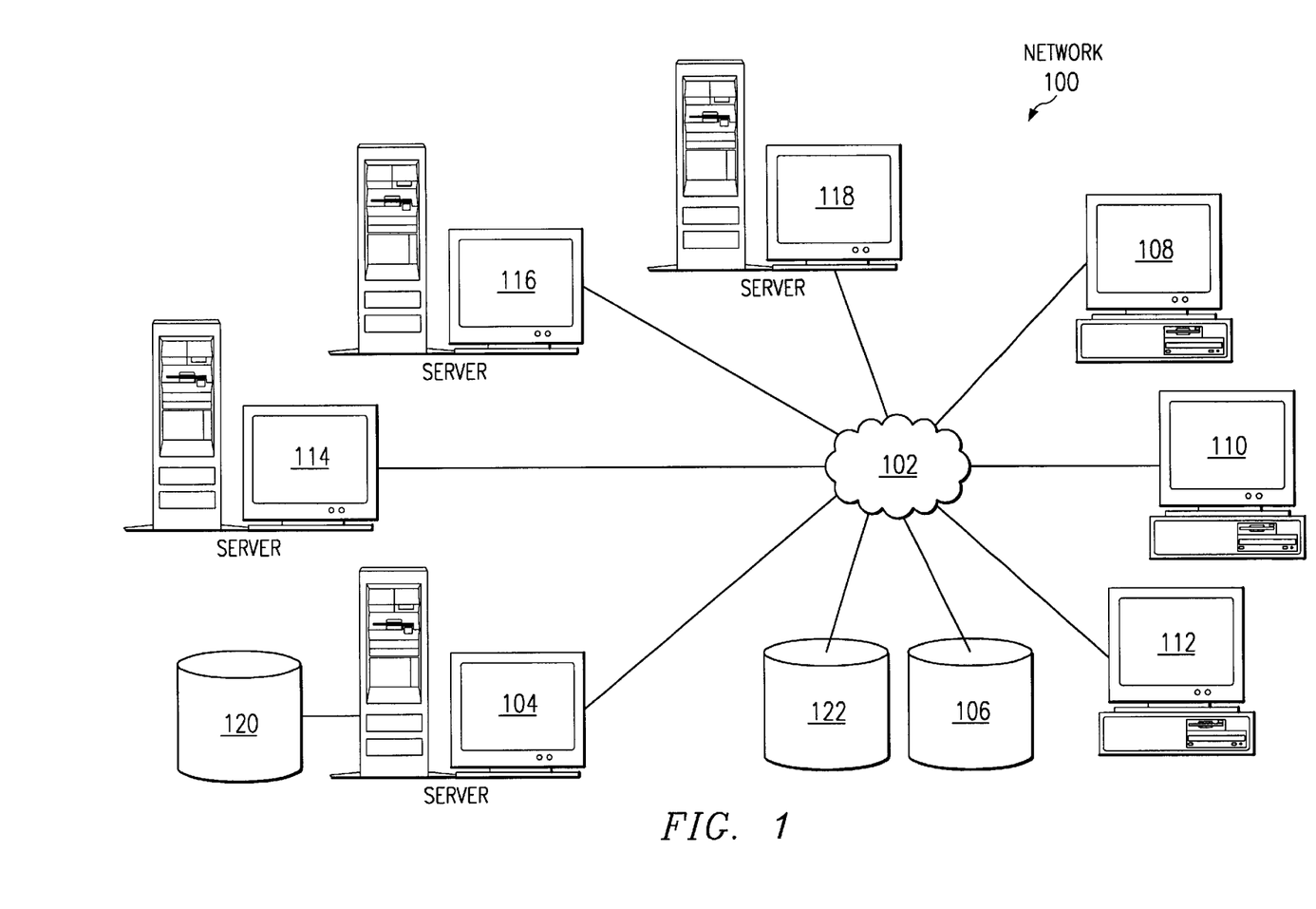
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. It is also possible for an individual server to have a data storage unit, such as storage unit 120 attached to server 104. Storage unit 120 may be a hard disk subsystem, such as that found in the present invention, with disks chained together to form a "daisy chain" and with one or more daisy chains attached to server 104.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
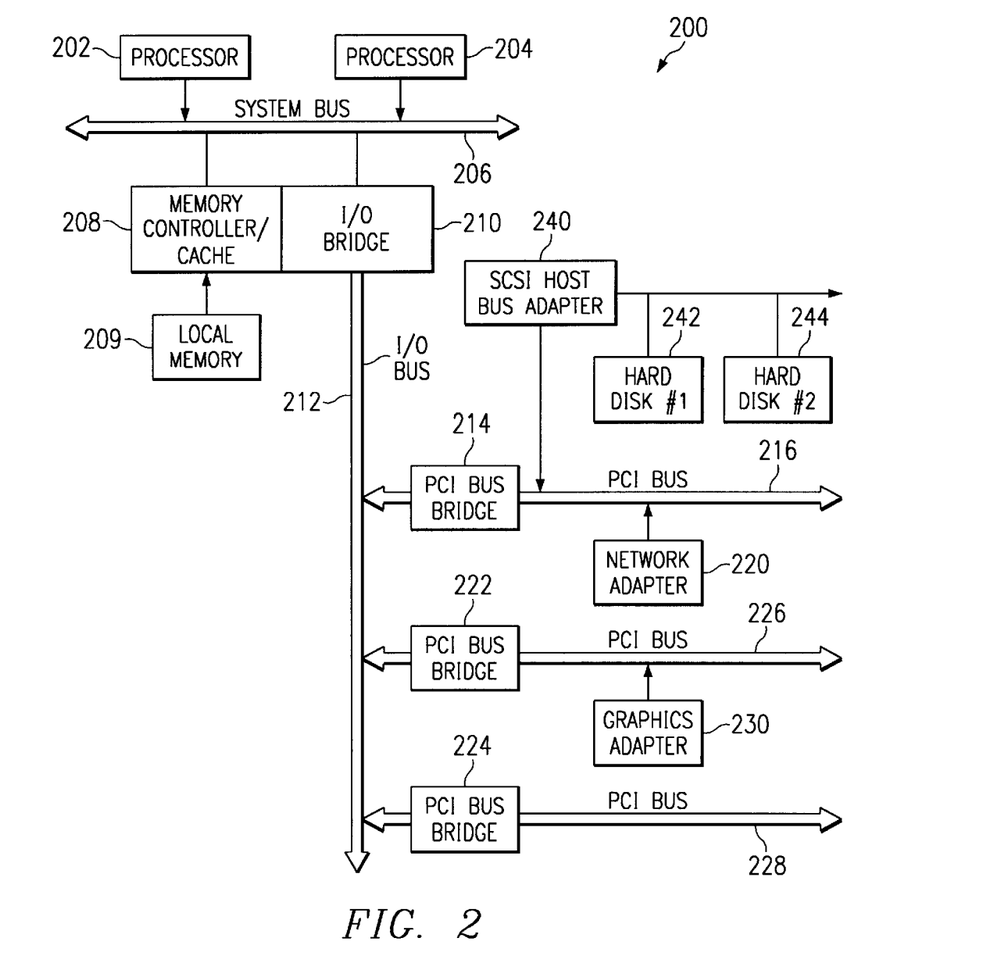
FIG. 2 is a block diagram of a data processing system that may be implemented as a server in which the present invention may be implemented.

Referring to FIG. 2, a block diagram of a data processing system which may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Network adapter 220 is connected to PCI bus 216, but as one of ordinary skill in the art will appreciate, many other devices can be connected to PCI bus 216. Typical PCI bus implementations will support four PCI expansion slots or add-in connectors. Communications links to network computers 108-112 in FIG. 1 may be provided through network adapter 220 connected to PCI local bus 216 through add-in boards.

Additional PCI bus bridges 222 and 224 provide interfaces for additional PCI buses 226 and 228, from which additional modems or network adapters may be supported. For example, memory mapped graphics adapter 230 is connected to PCI bus 226. In this manner, server 200 allows connections to multiple network computers.

Server 200 will often support substantial data storage, such as server 104 supports storage 120 in FIG. 1. This is commonly accomplished by attaching a "daisy chain" of hard disk drives onto a SCSI data bus. SCSI host bus adapter 240 is connected to PCI bus 216. Hard Disk #1 242 and Hard Disk #2 244 are shown connect to SCSI host bus adapter 240, but as one of ordinary skill in the art will appreciate, additional hard disks can be added, as needed. A preferred embodiment of the present invention deals with configuration of a SCSI bus to enhance performance of a set of disk drives on a server machine.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
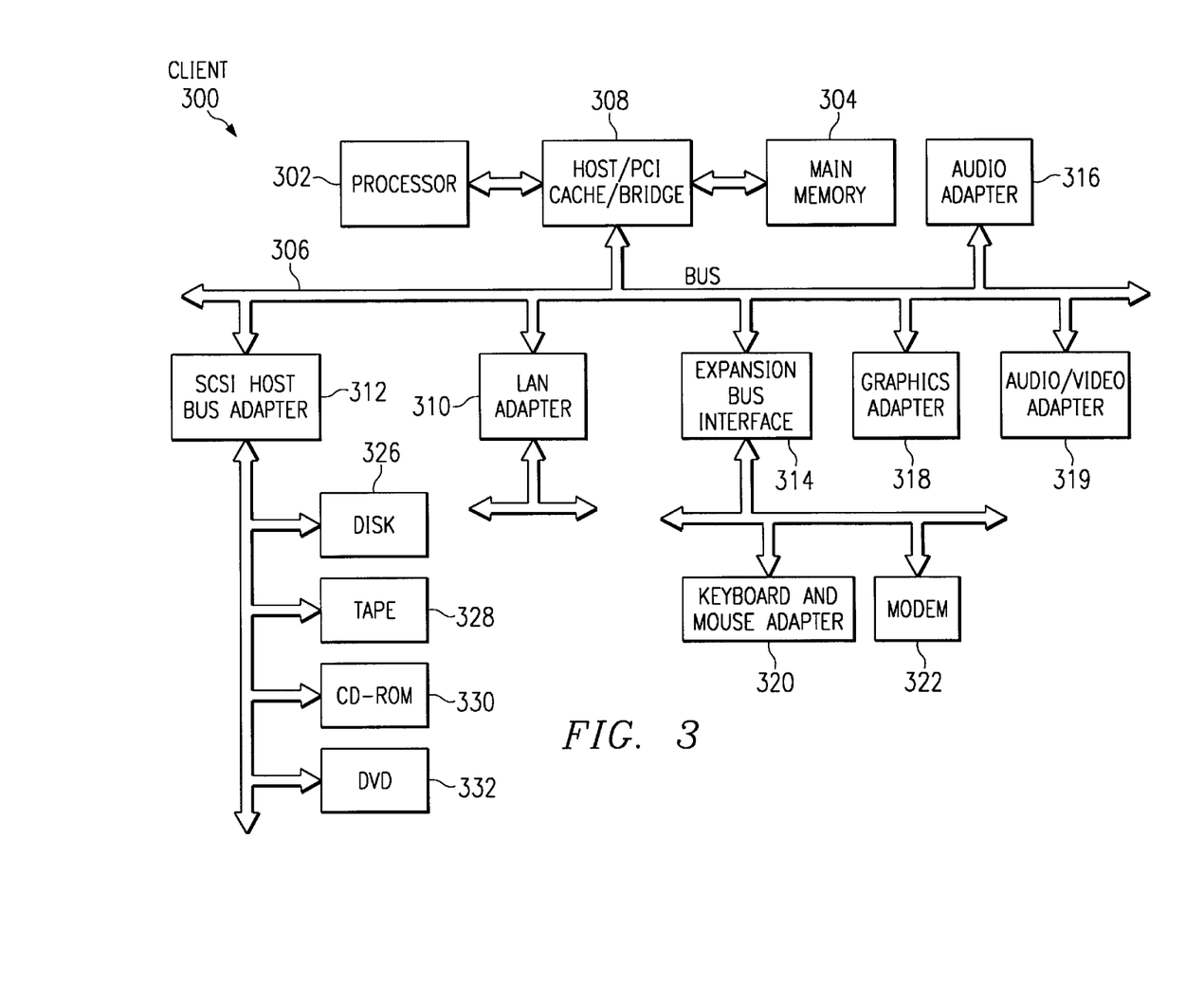
FIG. 3 is a block diagram of a data processing system that may be implemented as a client in a distributed data processing system.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, and modem 322.

In the depicted example, SCSI host bus adapter 312 provides a connection for hard disk drive 326, tape drive 328, CD-ROM drive 330, and digital video disc read only memory drive (DVD-ROM) 332. If the client machine is also acting as a "server" for a local area network, it is possible for SCSI host bus adapter 312 to act as a data repository for the local area network. In this case, a daisy chain of hard disk drives can be attached to SCSI host bus adapter 312. For this situation the bus configuration apparatus and method described in this invention could also be applied to Client 300. However, for simplicity, we will refer to the present invention being installed on a server machine, such as server 104 in FIG. 1 and the expansion of a server machine in FIG. 2.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4A:
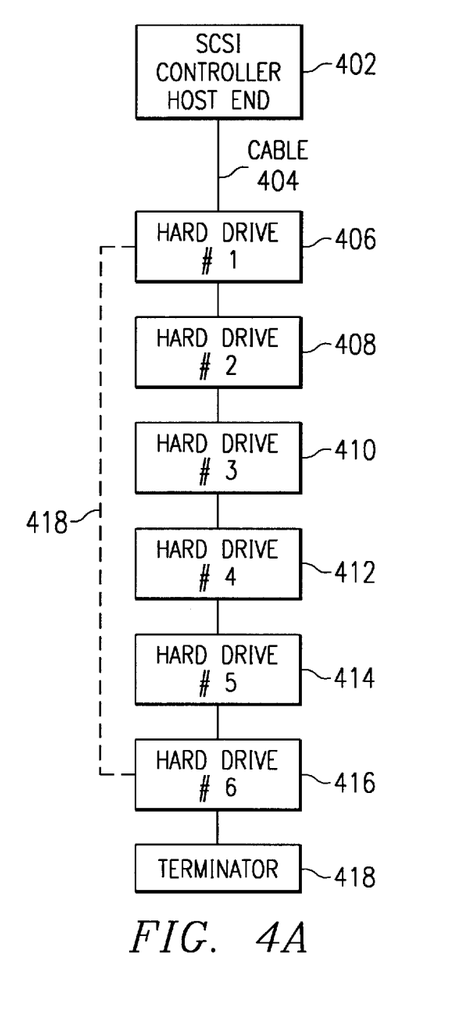
FIG. 4A is a block diagram of a "daisy chain" of single ended (SE) disk drives that perform best using termination and a loop topology in accordance with a preferred embodiment of the present invention.

With reference now to FIG. 4A, a block diagram depicts a "daisy chain" of disk drives that perform best using a SE (single ended) mode, in accordance with a preferred embodiment of the present invention. In particular, for this preferred embodiment, we assume a 20 MHz "Ultra" protocol on the SCSI bus to access the disk drives.

SCSI Controller Host End 402 is attached serially to the first drive in the chain, Hard Drive #1 (HD1) 406 using "long" SCSI cable 404. In a preferred embodiment, the cable length is 44 inches. Five other hard drives, 408, 410, 412, 414, and 416, are "daisy chained" off of HD1 406. Hard Drive #6 (HD6) connects to Terminator 418. As described in the next paragraph, there is a performance problem if HD6 is simply terminated. One way to solve this problem is to provide redrive circuitry at the end of the cable, but this is an expensive solution. This invention introduces a much easier solution, the installation of jumper 418 between HD6 416 and HD1 406 forming a loop topology.

The need for the loop topology is based on the following phenomenon. If jumper 418 is not present, an ACK (acknowledge) signal in SE mode results in "slope reversals" at the near end of the chain (specifically at HD1 406 and HD2 408). In particular, ACK@HD1 has a deep and long slope reversal that results in SCSI bus errors. This reversal is due to a discontinuity caused by the heavily loaded section of the net within the backplane with respect to SCSI cable 402. The large length of that section exaggerates the near-end effect for HD1 which results in the observed deep and long slope reversal. Removal of some of the hard drives from the daisy chain reduces the slope reversal, but this is not an acceptable solution. An alternative solution is to connect the near-end (HD1) and far-end (HD6) points together that results in removal of the slope reversal and good signal quality on the ACK signal.

Figure 4B:
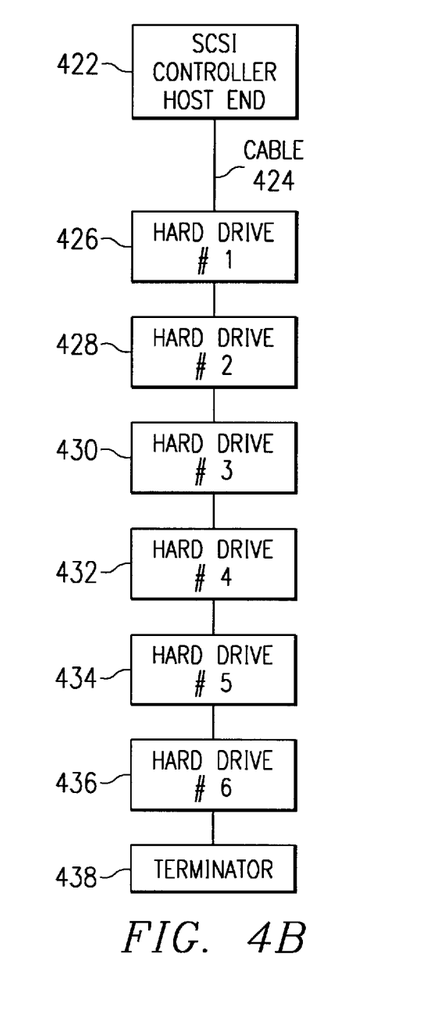
FIG. 4B is a block diagram of a "daisy chain" of LVD (low voltage differential) disk drives that perform best using only a termination in accordance with a preferred embodiment of the present invention.

With reference now to FIG. 4B, a block diagram depicts a "daisy chain" of disk drives that perform best using a low voltage differential (LVD) mode in accordance with a preferred embodiment of the present invention. In particular, for this preferred embodiment, we assume a 40 MHz "Ultra Plus" protocol on the SCSI bus to access the disk drives. Any LVD disk drive can also function in SE mode, if required.

SCSI Controller Host End 422 is attached serially to the first drive in the chain, HD1 426 using SCSI cable 424. Five other LVD hard drives, 428, 430, 432, 434, and 436, are "daisy chained" off of HD1 426. This chain of LVD disk drives will produce the best performance if HD6 436 is terminated by Terminator 438. It is important to note that the loop topology shown in FIG. 4A completely destroys the signal quality in LVD mode, so there appears to be no bus configuration compatible with both SE and LVD protocols.

Figure 4C:
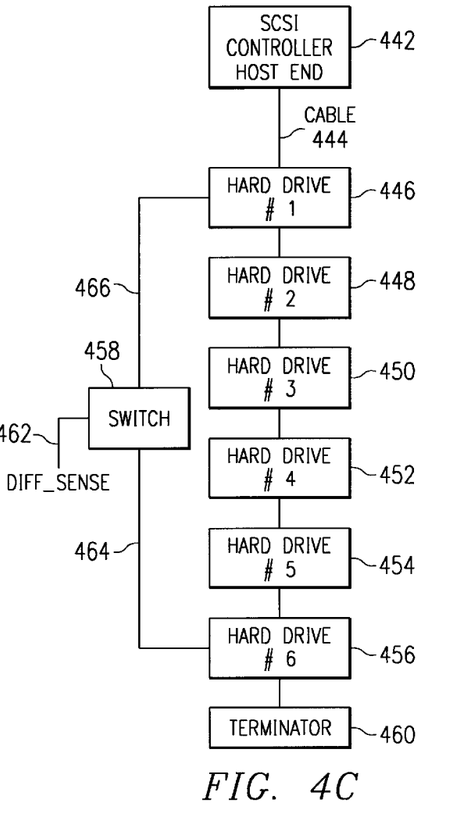
FIG. 4C is a block diagram of a "daisy chain" of disk drives that can accommodate both SE and LVD modes of operations in accordance with a preferred embodiment of the present invention.

A key feature of this invention is shown in FIG. 4C, a block diagram of a "daisy chain" of disk drives that can accommodate both SE and LVD modes of operation in accordance with a preferred embodiment of the present invention. This invention takes advantage of the fact that a LVD disk drive can also function in SE mode. If any drive in the daisy chain requires operation in the SE mode, then any other drive in the chain attempting to use LVD mode is switched to SE mode and the entire chain operates in SE mode. However, if all drives are capable of running in the faster LVD mode, then the entire chain operates in this mode.

SCSI Controller Host End 442 is attached serially to the first drive in the chain, HD1 446 using SCSI cable 444. Five other hard drives, 448, 450, 452, 454, and 456, are "daisy chained" off of HD1 446. HD6 is connected to Terminator 460, similar to the configurations shown in FIGS. 4A and 4B. These hard drives may be capable of SE mode only or may be capable of either SE or LVD modes. HD6 456 is connected to the input of switch 458 by connector 464. Switch 458 is connected to HD1 446 by connection 466. The position of switch 458 is determined by the input signal 462 named DIFF_SENSE.

In a preferred embodiment, switch 458 is an electromechanical relay. If switch 458 receives no voltage (0 volt) at DIFF_SENSE 462, then switch input from connection 464 is feed to switch output at connection 468 to form a loop topology appropriate for SE mode of operation. If switch 458 receives a positive voltage (1 volt) at DIFF_SENSE 462, then switch input is left open to form a terminated chain appropriate for LVD mode of operation. As one of ordinary skill in the art will appreciate, use of an electronic switch in place of a relay is also possible resulting in an alternative embodiment of the present invention that is less expensive and more reliable.

Figure 5:
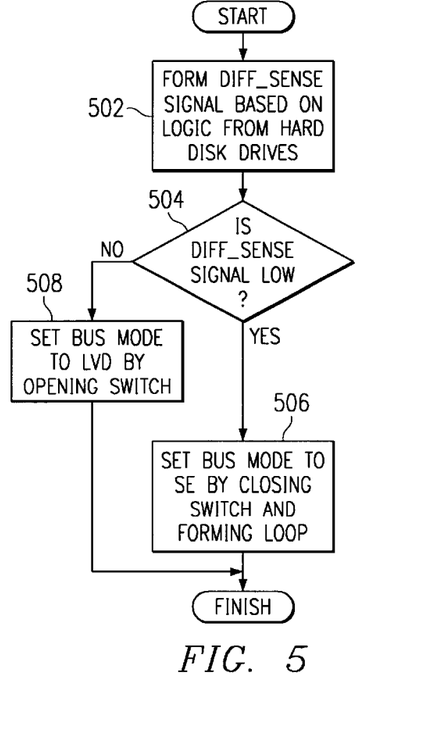
FIG. 5 is a flowchart illustrating selection of the correct mode of operation in accordance with a preferred embodiment of the present invention.

FIG. 5 is a flowchart illustrating the determination of the appropriate setting for the DIFF_SENSE signal 462 for a preferred embodiment of the invention. The signal DIFF_SENSE is formed by a "wire AND" of individual signals from the hard drives (step 502). If any one of these signals is low due to the presence of an SE drive, then the DIFF_SENSE signal is low (step 504: Yes) and the switch is closed to form a loop topology (step 506). If all of the signals are high, then the DIFF_SENSE signal is high (step 504: No) and the switch is open to set the bus to LVD mode (step 508).

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method for configuring a system bus in a data processing system, the method comprising the steps of:
    detecting an operating mode for each of a plurality of devices connected to the system bus;
    identifying a most restrictive operating mode from the detected operating modes; and
    setting a bus configuration mode based on the most restrictive operating mode, wherein setting a bus configuration mode includes setting a switch to one of two states: closed to form a loop configuration and open to disconnect the loop configuration,
    wherein the plurality of devices are disk drives connected in a daisy chain of disk drives, wherein the operating mode of the plurality of disk drives is one of a Single Ended (SE) bus configuration mode or a Low Voltage Difference (LVD) bus configuration mode, and wherein, if the detected modes include both the SE bus configuration mode and the LVD bus configuration mode, then the most restrictive operating mode is the SE bus configuration mode.

2. The method of claim 1, wherein the system bus is a Small Computer System Interface (SCSI) bus.

3. The method of claim 1, wherein setting the bus configuration includes enabling a jumper from a last disk drive to a first disk drive in the daisy chain of disk drives to form a loop configuration.

4. The method of claim 3, wherein the SE bus configuration mode involves enabling the jumper to form a loop configuration.

5. The method of claim 1, wherein setting the bus configuration includes disabling a jumper from a last disk drive to a first disk drive in the daisy chain of disk drives to prevent a loop configuration.

6. The method of claim 5, wherein the LVD bus configuration mode involves disabling the jumper to prevent the loop configuration.

7. The method of claim 1, wherein indicator signals on the disk drives are set to a positive voltage if the disk drives operate in the LVD bus configuration mode and are set to zero voltage if the disk drives operate in the SE bus configuration mode.

8. The method of claim 7, wherein detecting a plurality of devices connected to the system bus includes receiving a control signal generated by a logical AND of the indicator signals from the plurality of disk drives.

9. The method of claim 8, wherein the control signal is zero volts if any indicator signal from the indicator signals is zero volts and the control signal is a positive voltage only if all of the indicator signals are a positive voltage.

10. The method of claim 8, wherein setting a bus configuration includes setting a switch to one of two states: closed to form a loop configuration required for an SE bus configuration mode and open to disconnect the loop configuration, as required by an LVD bus configuration mode.

11. The method of claim 10, wherein the control signal closes the switch if the control signal is zero volts and the control signal opens the switch if the control signal is a positive voltage.

12. The method of claim 11, wherein the switch is an electromagnetic relay.

13. The method of claim 11, wherein the switch is an electronic switch.

14. A method of configuring a system bus to which a plurality of devices are coupled, the devices being operated in one of a plurality of modes, the method comprising the steps of:
    detecting a most restrictive operating mode from the plurality of devices; and
    setting a system bus configuration to be compatible with the most restrictive operating mode, wherein setting a system bus configuration includes setting a switch to one of two states: closed to form a loop configuration and open to disconnect the loop configuration,
    wherein the plurality of devices are disk drives connected in a daisy chain of disk drives, wherein the operating mode of the plurality of disk drives is one of a Single Ended (SE) bus configuration mode or a Low Voltage Difference (LVD) bus configuration mode, and wherein, if the detected modes include both the SE bus configuration mode and the LVD bus configuration mode, then the most restrictive operating mode is the SE bus configuration mode.

15. An apparatus for dynamically configuring a system bus in a data processing system, the apparatus comprising:
    a detecting means for detecting an operating mode for each of a plurality of devices connected to the system bus;
    an identifying means for identifying a most restrictive operating mode from the detected operating modes; and
    a setting means for setting a bus configuration mode based on the most restrictive operating mode, wherein the setting means for a bus configuration mode is a switch with one of two states: closed to form a loop configuration and open to disconnect the loop configuration,
    wherein the plurality of devices are disk drives connected in a daisy chain of disk drives, wherein the operating mode of the plurality of disk drives is one of a Single Ended (SE) bus configuration mode or a Low Voltage Difference (LVD) bus configuration mode, and wherein, if the detecting means detects both the SE bus configuration mode and the LVD bus configuration mode, then the most restrictive operating mode is the SE bus configuration mode.

16. The apparatus of claim 15, wherein the system bus is a Small Computer System Interface (SCSI) bus.

17. The apparatus of claim 15, wherein the setting means for the bus configuration enables a jumper from a last disk drive to a first disk drive in the daisy chain of disk drives to form a loop configuration.

18. The apparatus of claim 17, wherein the SE bus configuration mode involves enabling the setting means to form a loop configuration.

19. The apparatus of claim 15, wherein the setting means for the bus configuration disables a jumper from a last disk drive to a first disk drive in the daisy chain of disk drives to prevent a loop configuration.

20. The method of claim 19, wherein the LVD bus configuration mode involves disabling the setting means to prevent the loop configuration.

21. The apparatus of claim 15, wherein indicator signals on the disk drives are set to a positive voltage if the disk drives operate in the LVD bus configuration mode and are set to zero voltage if the disk drives operate in the SE bus configuration mode.

22. The apparatus of claim 21, wherein the identifying means for identifying the most restrictive operating mode is a control signal based on a logical AND of the indicator signals from the plurality of disk drives.

23. The apparatus of claim 22, wherein the control signal is zero volts if any indicator signal from the indicator signals is zero volts and the control signal is a positive voltage only if all of the indicator signals are a positive voltage.

24. The apparatus of claim 23, wherein the control signal closes the switch if the control signal is zero volts and the control signal opens the switch if the control signal is a positive voltage.

25. The apparatus of claim 23, wherein the switch is an electromagnetic relay.

26. The apparatus of claim 23, wherein the switch is an electronic switch.

27. An apparatus for dynamically configuring a system bus in a data processing system, the apparatus comprising:

an indicator signal for identifying an operating mode for each of a plurality of disk drives connected to the system bus;

a logical circuit for identifying a most restrictive operating mode from the detected operating modes; and a switch for setting a bus configuration based on the most restrictive operating mode, wherein the switch for setting a bus configuration has one of two states: closed to form a loop configuration and open to disconnect the loop configuration, wherein the operating mode of the plurality of disk drives is one of a Single Ended (SE) bus configuration mode or a Low Voltage Difference (LVD) configuration mode, and wherein the most restrictive operating mode is the SE bus configuration mode.

28. The apparatus of claim 27, wherein the system bus is a Small Computer System Interface (SCSI) bus and the disk drives connected to the system bus form a daisy chain.

29. The apparatus of claim 27, wherein the switch enables a jumper from a last disk drive to a first disk drive in the daisy chain of disk drives to form a loop configuration in the SE bus configuration mode.

30. The apparatus of claim 27, wherein the switch disables a jumper from a last disk drive to a first disk drive in the daisy chain of disk drives to prevent a loop configuration in the LVD bus configuration mode.

31. The apparatus of claim 27, wherein the indicator signal on the disk drive is set to a positive voltage if the disk drive operates in the LVD bus configuration mode and is set to zero voltage if the disk drive operates in the SE bus configuration.

32. The apparatus of claim 31, wherein the logical circuit for identifying a most restrictive operating mode is a logical AND of the indicator signals from the plurality of disk drives and, wherein the logical circuit generates a control signal that is zero volts if any indicator signal from the plurality of disk drives is zero volts and the control signal is a positive voltage only if all of the indicator signals are positive voltage.

33. The apparatus of claim 32, wherein the control signal closes the switch if the control signal is zero volts and the control signal opens the switch if the control signal is a positive voltage.

* * * * *